Patented Feb. 12, 1952

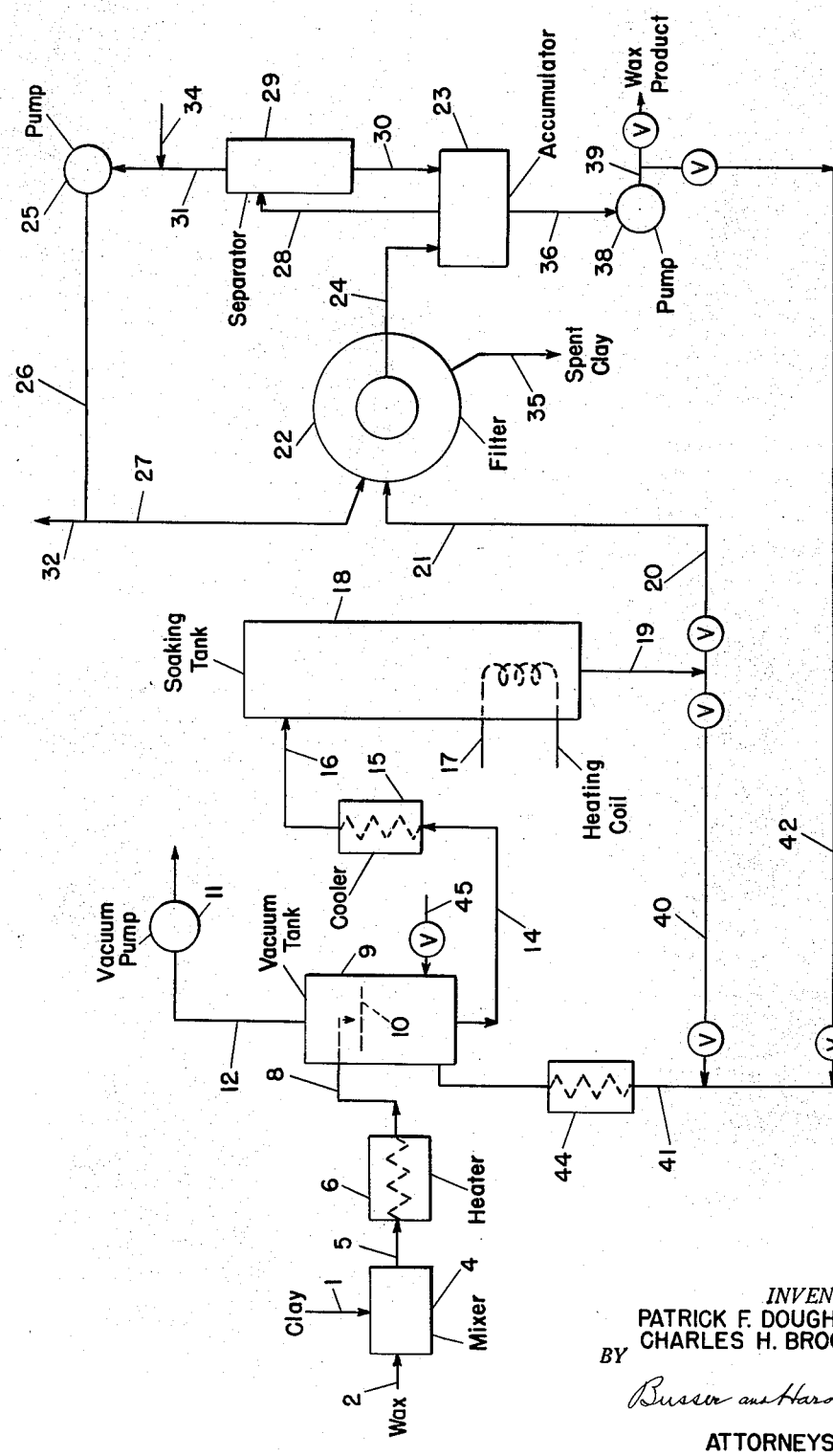

2,585,895

UNITED STATES PATENT OFFICE 2,585,895

WAX REFINING

Patrick F. Dougherty, Chester Heights, and Charles H. Brooks, Mount Holly, N. J., assignors to Sun Oil Company, Philadelphia, Pa., a corporation of New Jersey Application March 17, 1950, Serial No. 150,276

10 Claims. (Cl. 196—21)

This invention relates to a process for the purification of waxes. More specifically, the present invention relates to a process for the deodorization and decolorization of waxes.

Petroleum waxes are generally obtained by separation thereof from lubricating oil fractions obtained in petroleum refining, usually by chilling oil fractions and separating the precipitated wax. Various processes for purifying the separated wax, such as sweating or crystallization from solvents to de-oil the wax, have been described. In such processes the wax charge frequently has a foul odor which is carried over into the final product, the product also being colored, usually from light yellow to dark brown. Improvements in odor and color have heretofore been obtained by treatment of the wax with solid adsorbent materials such as bauxite, fuller's earth, other clays, and other active adsorbents, such as bone black. For example, molten wax may be percolated through a fixed bed of such solid adsorbents. In these processes it has heretofore been necessary to employ excessive quantities of adsorbent materials in order to achieve the desired results, and after such treatment the final wax product may develop color, a foul odor, or both especially when exposed to air at elevated temperatures. Also, in such processes where an operation is conducted under an inert atmosphere, odorous materials foul the inert gas employed, making necessary constant bleeding of the fouled gas and addition of an equivalent quantity of fresh gas.

An object of the present invention is to provide a rapid and economical process for the deodorization and decolorization of waxes.

A further object is to substantially reduce the quantity of solid adsorbent required for the decolorization and deodorization of waxes.

A further object is to prepare a wax product of improved color stability and odor stability. Other objects appear hereinafter.

It has now been discovered that by admixing wax and a solid adsorbent to form a slurry, heating the resulting slurry to a temperature of from about 50° F. to 300° F. above the melting point of the wax, and then subjecting the heated admixture to a vacuum followed by rapid cooling to a temperature also above the melting point of the wax, and maintaining such reduced temperature for a time sufficient to decolorize the wax, a relatively stable, odorless, and colorless product is obtained.

The present invention may be more readily understood by reference to the accompanying drawing, which is a flow diagram illustrating the present process. Clay, used to illustrate suitable solid adsorbents, and molten wax are introduced into mixer 4 through lines 1 and 2 respectively. The so-formed slurry passes through line 5 into heater 6, wherein the temperature of the slurry is increased to a desired value, which is from about 50° F. to 300° F., and preferably from 75° F. to 275° F., above the melting point of the wax. The heated slurry then passes through line 8 into vacuum tank 9, wherein the slurry stream is forced against splash plate 10 and descends in a dispersed state to the tank bottom while being subjected to sub-atmospheric pressure. Other means, such as spray nozzle, may be employed to disperse the slurry. Vacuum tank 9 is maintained under a sub-atmospheric pressure, advantageously from 1 to 2 p. s. i. by means of a vacuum pump 11. Moisture, in the form of steam, and odorous materials are removed from the system through line 12 and vacuum pump 11, and may be discarded or collected as desired. The wax-clay slurry descends in vacuum tank 9 in which a minimum liquid level is maintained and at the bottom thereof contacts a coolant, hereinafter described, which causes a rapid quenching, i. e., cooling, of the slurry. A mixture of the wax-clay slurry and the coolant leaves vacuum tank 9 through line 14 and passes through cooler 15, which regulates the temperature of the slurry to the value desired for completing the decolorization of the wax. The slurry then passes through line 16 into soaking tank 18 equipped with heating coil 17, and preferably with agitating means (not shown), wherein the slurry remains from about ¼ to 3 hours, during which time decolorization of the wax by the clay is completed. The temperature within the soaking tank is preferably from 20° F. to 40° F. above the melting point of the wax, and must be below the temperature of the initial heating. The slurry leaves soaking tank 18 through lines 19, 20, and 21, and passes to filter 22, where the wax and clay are separated. The wax filtrate is passed from the filter through line 24 to accumulator 23, and then to product storage or further processing through line 36, pump 38, and line 39. Filter 22 is preferably a rotary vacuum filter of common design, and is advantageously operated under an inert atmosphere, such as an atmosphere of flue gas, carbon dioxide, or nitrogen, in order to prevent oxidation by air. This is conveniently accomplished by employing pump 25 to supply inert gas to the pressure side of filter 22 through lines 26 and 27. The gas leaves filter 22, together with wax, through line 24, enters accumulator 23, and passes through line 28 to separator 29. Accumulator 23 is under the same pressure as the suction side of filter 22. In separator 29 the gas and any entrained wax is separated, the wax returning to accumulator 24 through line 30, and the gas recirculating through the system by passing to pump 25 through line 31. If desired, a portion of gas may be removed from the system through line 32, and a fresh quantity introduced through line 34.

Spent clay is removed from the filter 22 through line 35 and may be regenerated for recycling through the operation or discarded.

As the coolant, or quenching material, used in vacuum tank 9, it is advantageous to use a portion of the wax-clay slurry from soaking tank 18. Thus, a portion of the slurry from line 19 is passed through lines 40 and 41 into vacuum tank 9. An alternate and preferred method is to use a portion of the filtered wax from line 39, which portion can be passed through lines 42 and 41 into vacuum tank 9. Heat exchanger 44 provides for regulation of the temperature of the selected coolant, the preferred temperature being approximately the same as employed in soaking tank 18. By using the clay-wax slurry or wax product as the quenching material, the introduction of foreign material to the system is avoided.

Vacuum tank 9 is preferably designed so that the residence time therein of the wax-clay slurry is short. As described above, the vacuum tank is advantageously equipped with a splash plate against which the slurry stream is forced in order to disperse the stream. Other designs may be employed, such as side to side trays. Also, a preferred embodiment is the introduction of a stripping medium, preferably an inert gas, such as flue gas, into the vacuum tank above the liquid level therein, but in contact with the descending dispersed slurry, such as through line 45 of the drawing. The introduced gas assists in displacing and flushing odorous materials and moisture from the system through lines 12 and pump 11. A further variation is to introduce such inert gas beneath the liquid level of the slurry while maintaining a vacuum. Other modifications of operation technique will be apparent to those skilled in the art, as will the use of other inert gases, such as nitrogen, carbon dioxide, and steam.

Additional valves, pumps, and the like, the location and operation of which is apparent to those skilled in the art, have been omitted from the diagram for simplicity.

In carrying out the process of the present invention, it is important to observe certain limits of operating conditions in order to achieve the desired advantages of the process. The mixture of wax and clay, before being subjected to the effect of the vacuum, should be heated to a temperature of from 50° F. to 300° F. above the melting point of the wax, and this temperature should be at least 10° F. above any subsequent temperature in the process. At temperatures below this range the advantages of the present process are not obtained, and at higher temperatures no additional beneficial results are observed, and such high temperatures may have a deleterious affect on the wax, such as cracking. The temperature of the soaking tank, wherein the wax is decolorized, should be maintained at least 10° F. below the temperature of the initial heating, and is advantageously from about 20° F. to 40° F. above the melting point of the wax.

The sub-atmospheric pressure to which the heated wax-clay slurry is subjected, e. g., the pressure within the vacuum tank of the diagram, must be below any subsequent pressure to which the wax is subjected. Thus, when using a suction filter, preferably employed in the present process to separate wax and clay, in conjunction with an accumulator which is under reduced pressure, it is essential that the pressure within the vacuum tank be maintained at least 0.5 p. s. i. below the pressure in the vacuum side of the filter, which includes the accumulator. Preferably the pressure in the vacuum tank is maintained from 0.5 to 2.0 p. s. i. while the pressure on the suction side of the filter is maintained from 2.5 to 10 p. s. i.

It is important that the time during which the clay-wax slurry is subjected to a high temperature and low pressure in the vacuum tank be maintained as short as practical. The flashing of the heated wax-clay slurry into a vacuum, rapidly followed by quenching, gives a product of better color and odor stability than products prepared by prior processes. Preferably, the residence time of the clay-wax slurry in the vacuum tank is from one second to 10 minutes. The residence time of the clay-wax slurry in the soaking tank is not critical and may be varied in accordance with the requirements of the wax being treated, the quantity and type of solid adsorbent employed, and the like. Preferably, the residence time in the soaking tank is from ¼ to 3 hours.

While it is not desired to be limited by theoretical considerations, it is believed that at least a portion of the advantages of the present process accrue because the formation of odorous or coloring matter is accelerated by heating the wax in the presence of a solid adsorbent to a relatively high temperature, which formed materials are then removed by the process and hence are not thereafter formed. In other words, the source of odorous and coloring materials, which may as such be innocuous, but which may form compounds having a deleterious affect on the wax products, especially on contact with air at elevated temperatures, are removed from the wax by the present process.

A primary advantage of the present invention is the reduction in quantity of the solid adsorbent required to treat a specified quantity of wax. Thus, to obtain products equivalent in color and odor, a reduction of from 5% to 25% in the quantity of adsorbent employed is permissible, and the product exhibits greatly improved stability over the products of prior processes. In general, from about 1.5% to 20% by weight of clay gives good results, some variations to obtain optimum results being required depending largely on the wax being treated.

*Example*

A de-oiled paraffin wax having a melting point of substantially 130° F. was treated with about 20% by weight of clay (about 60 pounds per bbl.) at a temperature of 250° F. for 0.5 hours. The wax and clay were separated by filtration on a suction type rotating filter under an atmosphere of flue gas.

Odorous materials from the wax charge fouled the flue gas requiring constant bleeding of a substantial proportion thereof from the system, an equivalent quantity of fresh flue gas being constantly added.

Using the same wax stock in the process of the present invention, wherein 15% by weight of the same clay is employed, the slurry heated to 275° F., flashed into a vacuum tower maintained at a pressure of 2 p. s. i., quenched to 175° F. by wax from the subsequent filtration, maintained at 160° F. for 0.5 hours, and filtered as above described, it is possible to operate continuously using the same flue gas with only occasional make-up gas added to compensate for mechanical losses.

Another disadvantage of prior processes obviated by the present invention is that it is unnecessary to remove the moisture content of the solid adsorbent prior to its use in the process. In prior processes, unless the adsorbent, such as clay, is especially treated, the moisture contained therein, which is usually from 5% to 35% by weight of the adsorbent, is imparted to the wax and may render the product opaque or cloudy. In the present process such moisture is removed in the vacuum step.

Various petroleum waxes, preferably de-oiled, may be employed in the process of the present invention, such as paraffin or microcrystalline waxes having melting points of from about 100° F. to 200° F.

The invention claimed is:

1. A process for deodorizing and decolorizing a petroleum wax having a melting point of from about 100° F. to 200° F. which comprises admixing molten wax and clay, heating said admixture to a temperature of from 50° F. to 300° F. above the melting point of said wax, flashing said heated admixture in a dispsered state into sub-atmospheric pressure of from about 0.5 to 2.0 p. s. i., quenching said admixture to a temperature of from about 20° F. to 40° F. above the melting point of the wax by mixing with a coolant, continuously contacting said wax with said clay at said latter temperature for ¼ to 3 hours, and separating said wax and said clay by vacuum filtration.

2. Process according to claim 1 wherein said coolant is said admixture of wax and clay.

3. Process according to claim 1 wherein said coolant is wax separated from said admixture of wax and clay.

4. A process for deodorizing and decolorizing a petroleum wax having a melting point of from about 100° F. to 200° F. which comprises admixing molten wax and clay, heating said admixture to a temperature of from 50° F. to 300° F. above the melting point of said wax, flashing said heated admixture in a dispersed state into sub-atmospheric pressure of from about 0.5 to 2.0 p. s. i., mixing said admixture with a coolant and utilizing such mixture in reducing the temperature of said admixture to from about 20° F. to 40° F. above the melting point of the wax, continuously contacting said wax with said clay at said latter temperature for ¼ to 3 hours, and separating said wax and said clay by vacuum filtration.

5. Process according to claim 4 wherein said coolant is said admixture of wax and clay.

6. Process according to claim 4 wherein said coolant is wax separated from said admixture of wax and clay.

7. Process for deodorizing and decolorizing petroleum wax which comprises admixing petroleum wax and a solid adsorbent, heating said admixture to a temperature of from 50° F. to 300° F. above the melting point of said wax, flashing said heated admixture in a dispersed state into sub-atmospheric pressure of from about 0.5 to 2.0 p. s. i., quenching said admixture at least 10° F. but not below a temperature of 20° F. above the melting point of said wax by mixing with a coolant, continuously contacting said wax with said adsorbent at said latter temperature to substantially decolorize said wax, and separating said wax from said solid adsorbent.

8. Process according to claim 7 wherein said coolant is said admixture of wax and solid adsorbent.

9. Process according to claim 7 wherein said coolant is wax separated from said admixture of wax and solid adsorbent.

10. A process for deodorizing and decolorizing a petroleum wax having a melting point of from about 100° F. to 200° F. which comprises admixing molten wax and a solid adsorbent, heating said admixture to a temperature of from 75° F. to 275° F. above the melting point of said wax, flashing said heated admixture in a dispersed state into sub-atmospheric pressure of from about 0.5 to 2.0 p. s. i., quenching said admixture to a temperature of from about 20° F. to 40° F. above the melting point of the wax by mixing with a coolant, continuously contacting said wax with said solid adsorbent at said latter temperature for ¼ to 3 hours, and separating said wax and said solid adsorbent by vacuum filtration.

PATRICK F. DOUGHERTY.
CHARLES H. BROOKS.

REFERENCES CITED

The following references are of record in the file of this patent:

UNITED STATES PATENTS

| Number | Name | Date |
|---|---|---|
| 2,273,846 | Dunmire | Feb. 24, 1942 |
| 2,329,785 | Pool | Sept. 21, 1943 |
| 2,453,933 | Polizzotto et al. | Nov. 16, 1948 |